(12) United States Patent
Scarola

(10) Patent No.: US 8,830,391 B2
(45) Date of Patent: Sep. 9, 2014

(54) TELESCOPING MONOPOD CAMERA HOLDING APPARATUS AND METHOD

(75) Inventor: Kyle Scarola, Charlotte, NC (US)

(73) Assignee: Goscope, LLC, Charlotte, NC (US)

( * ) Notice: Subject to any disclaimer, the term of this patent is extended or adjusted under 35 U.S.C. 154(b) by 106 days.

(21) Appl. No.: 13/542,206

(22) Filed: Jul. 5, 2012

(65) Prior Publication Data

US 2013/0010186 A1    Jan. 10, 2013

Related U.S. Application Data

(60) Provisional application No. 61/504,929, filed on Jul. 6, 2011.

(51) Int. Cl.
*H04N 5/225* (2006.01)
*F16M 13/04* (2006.01)
*F16M 11/28* (2006.01)

(52) U.S. Cl.
CPC .............. *F16M 13/04* (2013.01); *F16M 11/28* (2013.01)
USPC ...................... 348/376; 248/187.1; 248/188.5

(58) Field of Classification Search
USPC ........................................................ 348/376
See application file for complete search history.

(56) References Cited

U.S. PATENT DOCUMENTS

| 5,065,249 | A * | 11/1991 | Horn et al. ................... 348/376 |
| 8,157,255 | B2 * | 4/2012 | Nishimura et al. ......... 270/58.23 |
| 2005/0243199 | A1 * | 11/2005 | Bohaker et al. ............... 348/373 |
| 2009/0084912 | A1 * | 4/2009 | Speggiorin ................ 248/176.3 |
| 2011/0129210 | A1 * | 6/2011 | McGucken ................... 396/422 |

* cited by examiner

*Primary Examiner* — Twyler Haskins
*Assistant Examiner* — Fayez Bhuiyan
(74) *Attorney, Agent, or Firm* — Clements Bernard PLLC; Christopher L. Bernard; Lawrence A. Baratta, Jr.

(57) ABSTRACT

The present invention provides a telescoping monopod apparatus for holding one or more cameras while a digital photograph or video recording is taken by a user, including: a plurality of concentrically-disposed telescoping shaft sections; a handle coupled to the plurality of concentrically-disposed telescoping shaft sections; and a head portion configured to receive and secure a camera, wherein the head portion includes: a neck portion; at least one substantially-flat camera-receiving surface; a pair of lipped retention members coupled to each of the substantially-flat camera-receiving surfaces present; and a central track structure coupled to each of the substantially-flat camera-receiving surfaces present.

10 Claims, 3 Drawing Sheets

TELESCOPING MONOPOD CAMERA HOLDING APPARATUS AND METHOD

CROSS-REFERENCE TO RELATED APPLICATION

The present patent application/patent claims the benefit of priority of U.S. Provisional Patent Application No. 61/504,929, filed on Jul. 6, 2011, and entitled "SCOPE CAMERA HOLDING APPARATUS AND METHOD," the contents of which are incorporated in full by reference herein.

FIELD OF THE INVENTION

The present invention relates generally to a telescoping monopod camera holding apparatus and method.

BACKGROUND OF THE INVENTION

It is often desirable for an outdoor enthusiast, adventure athlete, or the like to have a convenient and durable means to hold a camera such that they may take a digital photograph or video recording of themself and/or others during an activity. Preferably, this camera may be held at some distance from the object(s) to be photographed or recorded. Such cameras have become especially popular with the advent of the GoPro® (Woodman Labs, Inc.) line of cameras, which are environmentally hardened and protected for use in extreme conditions, including underwater conditions.

Thus, what is needed in the art is an improved telescoping monopod for holding a camera while a digital photograph or video recording is taken.

BRIEF SUMMARY OF THE INVENTION

In various exemplary embodiments, the present invention provides an improved telescoping monopod for holding a camera while a digital photograph or video recording is taken. The monopod apparatus includes a handle and a plurality of concentrically-disposed telescoping shaft sections, capable of providing an overall apparatus length of between about 10 in and about 50 in, preferably between about 20 in and about 40 in. The handle includes a strap or the like for selectively securing the monopod apparatus to a user during an activity or the like. The telescoping shaft sections are joined by one or more twist releases or the like. The monopod apparatus also includes a head portion that is configured to receive either one or two cameras, in alternative exemplary embodiments. Accordingly, the head portion includes one or two substantially-flat surfaces (which are substantially opposed in the two-camera application), each of which include a pair of lipped retention members and a central track structure. Preferably, the monopod apparatus weigh less than about 12 oz. More preferably, the monopod apparatus weighs less than about 8 oz. Various other telescoping, rotating, and articulating joints may also be used in conjunction with the above components.

In one exemplary embodiment, the present invention provides a telescoping monopod apparatus for holding one or more cameras while a digital photograph or video recording is taken by a user, including: a plurality of concentrically-disposed telescoping shaft sections; a handle coupled to the plurality of concentrically-disposed telescoping shaft sections; and a head portion configured to receive and secure a camera, wherein the head portion includes: a neck portion; at least one substantially-flat camera-receiving surface; a pair of lipped retention members coupled to each of the substantially-flat camera-receiving surfaces present; and a central track structure coupled to each of the substantially-flat camera-receiving surfaces present. The telescoping monopod apparatus also includes one or more twist releases coupling the plurality of concentrically-disposed telescoping shaft sections together and selectively securing the telescoping monopod apparatus at a fixed overall length. Optionally, the head portion is configured to simultaneously receive and secure two cameras and includes two substantially-flat camera-receiving surfaces. Each of the lipped retention members includes a substantially-horizontal portion coupled to a substantially-vertical portion. Optionally, the head portion is one or more of rotatable and articulatable with respect to the plurality of concentrically-disposed telescoping shaft sections.

In another exemplary embodiment, the present invention provides a method for providing a telescoping monopod apparatus for holding one or more cameras while a digital photograph or video recording is taken by a user, including: providing a plurality of concentrically-disposed telescoping shaft sections; providing a handle coupled to the plurality of concentrically-disposed telescoping shaft sections; and providing a head portion configured to receive and secure a camera, wherein the head portion includes: a neck portion; at least one substantially-flat camera-receiving surface; a pair of lipped retention members coupled to each of the substantially-flat camera-receiving surfaces present; and a central track structure coupled to each of the substantially-flat camera-receiving surfaces present. The telescoping monopod method also includes providing one or more twist releases coupling the plurality of concentrically-disposed telescoping shaft sections together and selectively securing the telescoping monopod apparatus at a fixed overall length. Optionally, the head portion is configured to simultaneously receive and secure two cameras and includes two substantially-flat camera-receiving surfaces. Each of the lipped retention members includes a substantially-horizontal portion coupled to a substantially-vertical portion. Optionally, the head portion is one or more of rotatable and articulatable with respect to the plurality of concentrically-disposed telescoping shaft sections.

BRIEF DESCRIPTION OF THE DRAWINGS

The present invention is illustrated and described herein with reference to the various drawings, inc which like reference numbers are used to denote like apparatus components/method steps, as appropriate, and in which.

DETAILED DESCRIPTION OF THE INVENTION

Figure 1:
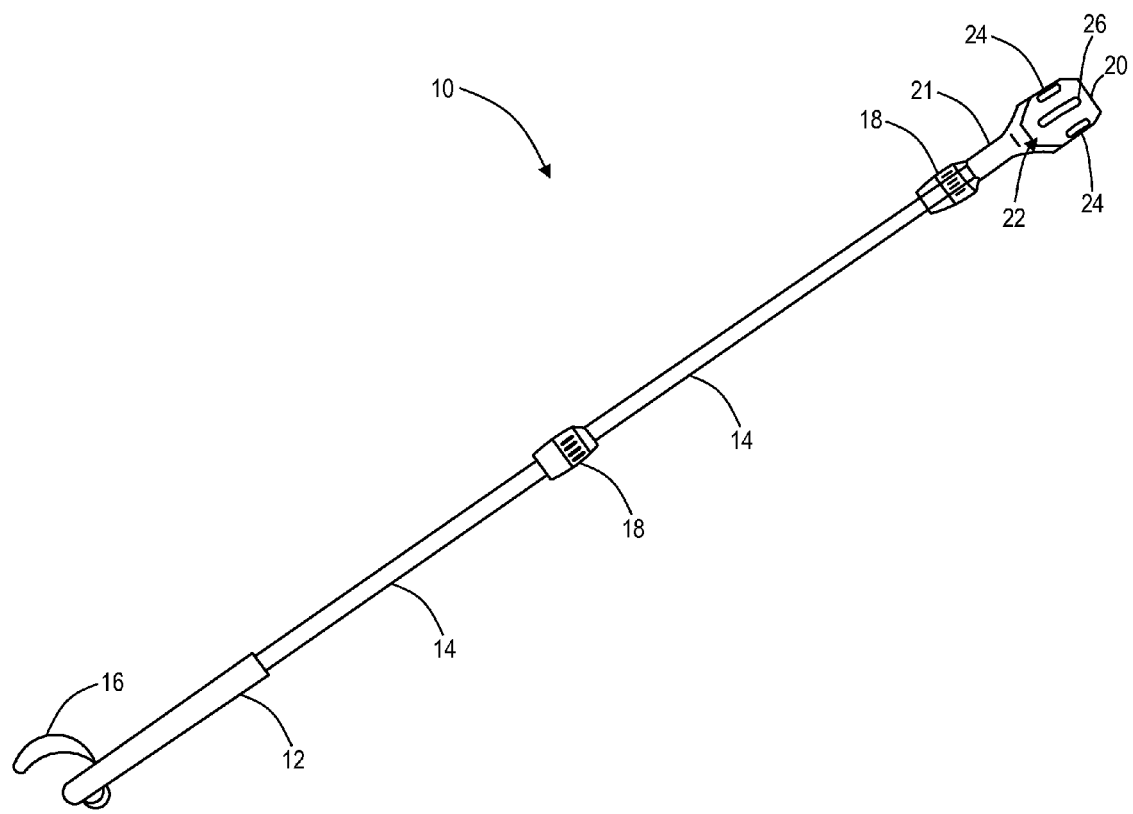
FIG. 1 is a planar view illustrating one exemplary embodiment of the telescoping monopod apparatus of the present invention.

Referring specifically to FIG. 1, again, in various exemplary embodiments, the present invention provides an improved telescoping monopod 10 for holding a camera (not illustrated) while a digital photograph or video recording is taken. The monopod apparatus 10 includes a handle 12 and a plurality of concentrically-disposed telescoping shaft sections 14, capable of providing an overall apparatus length of between about 10 in and about 50 in, preferably between about 20 in and about 40 in. The handle 12 includes a strap 16 or the like for selectively securing the monopod apparatus 10 to a user (not illustrated) during an activity or the like. The telescoping shaft sections 14 are joined by one or more twist releases 18 or the like. The monopod apparatus 10 also includes a head portion 20 that is configured to receive either one or two cameras, in alternative exemplary embodiments. Accordingly, the head portion 20 includes a neck portion 21 and one or two substantially-flat surfaces 22 (which are substantially opposed in the two-camera application), each of which include a pair of lipped retention members 24 and a central track structure 26. Preferably, the monopod apparatus 10 weigh less than about 12 oz. More preferably, the monopod apparatus 10 weighs less than about 8 oz. Various other telescoping, rotating, and articulating joints may also be used in conjunction with the above components.

The handle 12 is made of aluminum or the like, such that it is strong, durable, and water-resistant, and has an overall length of between about 10 in and about 40 in and an outer diameter of between about 0.5 in and about 3 in. Optionally, the handle 12 may have any suitable cross-sectional shape and/or include any type and number of raised structures configured and positioned to enhance the grip of a user, especially in the presence of moisture or the like. The strap 16 is made of nylon or the like, such that it is also durable and water-resistant, and has an overall length of between about 4 in and about 10 in.

The plurality of concentrically-disposed telescoping shaft sections 14 each have a substantially-circular cross-sectional shape or the like and are each made of plastic or the like, such that each is strong, durable, and water-resistant, and each has an overall length of between about 1 in and about 4 in and an outer diameter of between about 0.5 in and about 3 in. Optionally, each of the plurality of concentrically-disposed telescoping shaft sections 14 is made of plastic or the like, and then coated with a water-resistant material. Because the telescoping shaft sections 14 are concentrically disposed, it is preferable that each has a progressively smaller outer diameter, from the proximal (i.e. handle) end to the distal (i.e. head portion) end of the monopod apparatus 10. The key consideration is that, collectively, the plurality of concentrically-disposed telescoping shaft sections 14 have sufficient strength to rigidly support the associated camera load when the monopod apparatus 10 is fully loaded and extended. Preferably, the plurality of concentrically-disposed telescoping shaft sections 14 are made to be substantially hollow in order to save weight.

The one or more twist releases 18 or the like are well known to those of ordinary skill in the art and are selectively actuated to either allow the plurality of telescoping shaft sections 14 to telescope with respect to one another or prevent the plurality of telescoping shaft sections 14 from telescoping with respect to one another. In this regard, the monopod apparatus 10 is either extended for use (to any desired degree) or retracted for storage (again, to any desired degree). The twist releases 18 may include a plurality of raised ridges or the like, making it easier to actuate them using moist fingers or the like.

Figure 2:
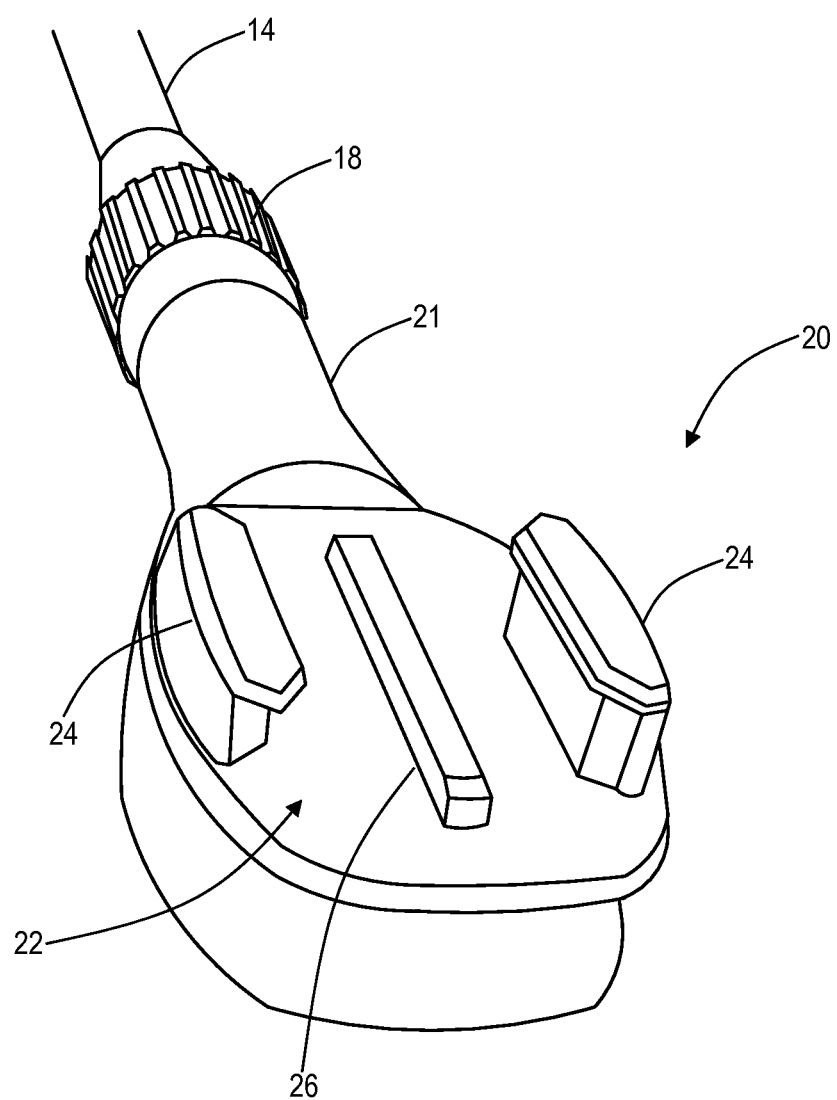
FIG. 2 is a perspective view illustrating one exemplary embodiment of the head portion of the telescoping monopod apparatus of the present invention, in a one-camera application.

Referring specifically to FIG. 2, in an exemplary single-camera embodiment, the head portion 20 includes a neck portion 21 and a substantially-flat surface 22, which includes a pair of lipped retention members 24 and a central track structure 26. The lipped retention members 24 and central track structure 26 may be separate attached components from the substantially-flat surface 22, or they may be integrally formed with the substantially-flat surface 22. Each lipped retention member 24 includes a substantially-horizontal portion coupled to a substantially-vertical portion coupled to the associated substantially-flat surface. The head portion 20 is made of plastic or the like, such that it is strong, durable, and water-resistant, and has an overall length of between about 1 in and about 4 in, an overall width of between about 1 in and about 4 in, and an overall thickness of between about 1 in and about 4 in. Preferably, the head portion 20 has an at least partially-rounded shape, such that it has no sharp edges. In operation, the lipped retention members 24 and central track structure 26 are configured to securely, but releasably, engage the retention portion of the camera attached thereto. Optionally, the neck portion 21 forms one or more shoulders with respect to the remainder of the head portion 20. The head portion 20 may be made to be partially or wholly hollow in order to save weight.

Figure 3:
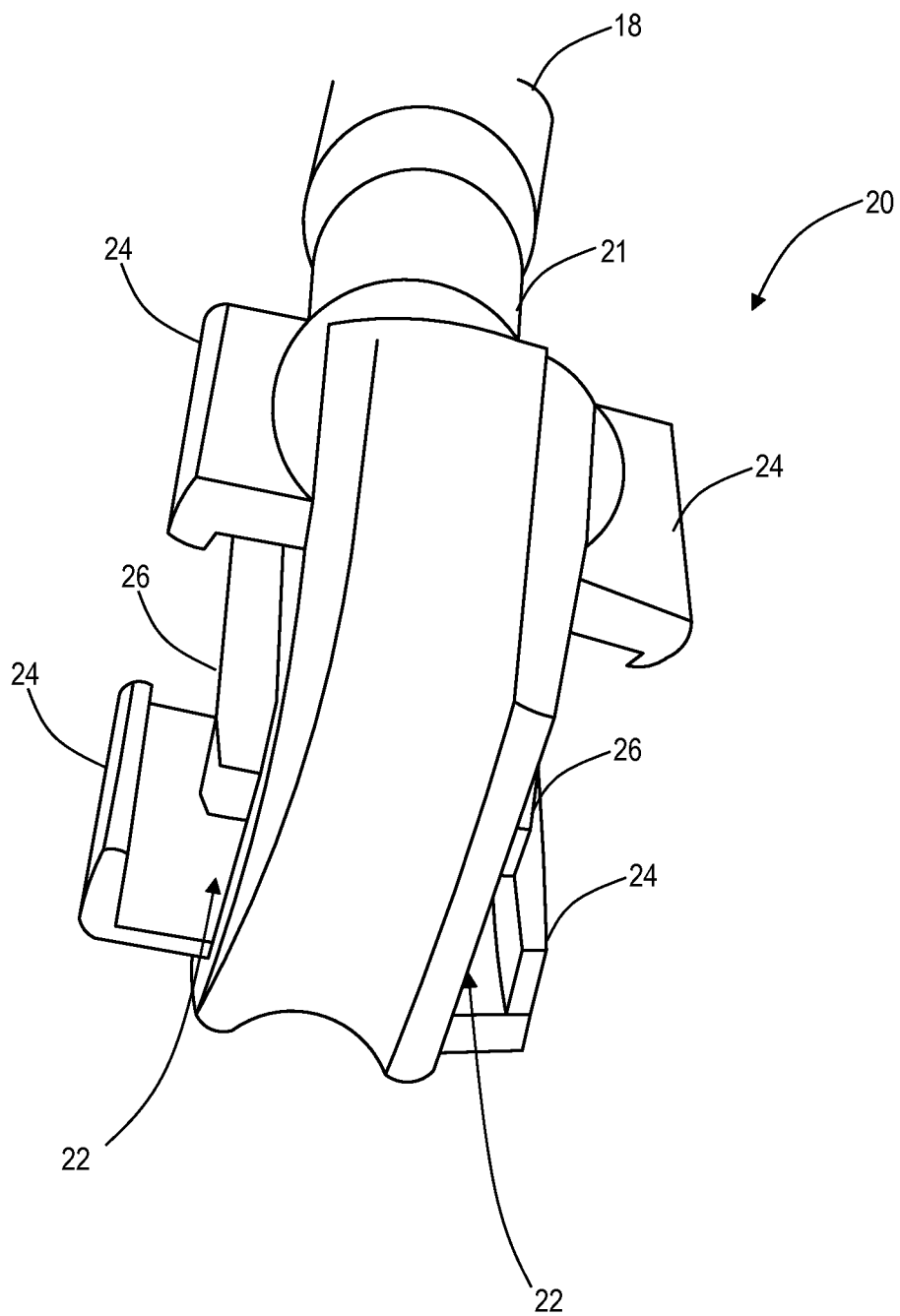
FIG. 3 is a perspective view illustrating another exemplary embodiment of the head portion of the telescoping monopod apparatus of the present invention, in a two-camera application.

Referring specifically to FIG. 3, in an exemplary dual-camera embodiment, the head portion 20 includes a neck portion 21 and a pair of opposed substantially-flat surfaces 22, which each include a pair of lipped retention members 24 and a central track structure 26. The lipped retention members 24 and central track structures 26 may be separate attached components from the substantially-flat surfaces 22, or they may be integrally formed with the substantially-flat surfaces 22. Each lipped retention member 24 includes a substantially-horizontal portion coupled to a substantially-vertical portion coupled to the associated substantially-flat surface. The head portion 20 is made of plastic or the like, such that it is strong, durable, and water-resistant, and has an overall length of between about 1 in and about 4 in, an overall width of between about 1 in and about 4 in, and an overall thickness of between about 1 in and about 4 in. Preferably, the head portion 20 has an at least partially-rounded shape, such that it has no sharp edges. In operation, the lipped retention members 24 and central track structures 26 are configured to securely, but releasably, engage the retention portions of the cameras attached thereto. Optionally, the neck portion 21 forms one or more shoulders with respect to the remainder of the head portion 20. The head portion 20 may be made to be partially or wholly hollow in order to save weight.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A telescoping monopod apparatus for holding one or more cameras while a digital photograph or video recording is taken by a user, comprising:
    a plurality of concentrically-disposed telescoping shaft sections;
    a handle coupled to the plurality of concentrically-disposed telescoping shaft sections; and
    a head portion configured to receive and secure a camera, wherein the head portion comprises:
        a neck portion;
        at least one substantially-flat camera-receiving surface;
        a pair of lipped retention members coupled to each of the substantially-flat camera-receiving surfaces present and configured to selectively retain a camera; and
        a central track structure coupled to each of the substantially-flat camera-receiving surfaces present and configured to selectively engage the camera, wherein the central track structure protrudes from the corresponding substantially-flat camera receiving surface and is disposed substantially parallel to and equidistant between the corresponding pair of lipped retention members.

2. The telescoping monopod apparatus of claim 1, further comprising one or more twist releases coupling the plurality of concentrically-disposed telescoping shaft sections together and selectively securing the telescoping monopod apparatus at a fixed overall length.

3. The telescoping monopod apparatus of claim 1, wherein the head portion is configured to simultaneously receive and secure two cameras and comprises two substantially-flat camera-receiving surfaces.

4. The telescoping monopod apparatus of claim 1, wherein each of the lipped retention members comprises a substantially-horizontal portion coupled to a substantially-vertical portion.

5. The telescoping monopod apparatus of claim 1, wherein the head portion is one or more of rotatable and articulatable with respect to the plurality of concentrically-disposed telescoping shaft sections.

6. A method for providing a telescoping monopod apparatus for holding one or more cameras while a digital photograph or video recording is taken by a user, comprising:
   providing a plurality of concentrically-disposed telescoping shaft sections;
   providing a handle coupled to the plurality of concentrically-disposed telescoping shaft sections; and
   providing a head portion configured to receive and secure a camera, wherein the head portion comprises:
      a neck portion;
      at least one substantially-flat camera-receiving surface;
      a pair of lipped retention members coupled to each of the substantially-flat camera-receiving surfaces present and configured to selectively retain a camera; and
      a central track structure coupled to each of the substantially-flat camera-receiving surfaces present and configured to selectively engage the camera, wherein the central track structure protrudes from the corresponding substantially-flat camera receiving surface and is disposed substantially parallel to and equidistant between the corresponding pair of lipped retention members.

7. The telescoping monopod method of claim 6, further comprising providing one or more twist releases coupling the plurality of concentrically-disposed telescoping shaft sections together and selectively securing the telescoping monopod apparatus at a fixed overall length.

8. The telescoping monopod method of claim 6, wherein the head portion is configured to simultaneously receive and secure two cameras and comprises two substantially-flat camera-receiving surfaces.

9. The telescoping monopod method of claim 6, wherein each of the lipped retention members comprises a substantially-horizontal portion coupled to a substantially-vertical portion.

10. The telescoping monopod method of claim 6, wherein the head portion is one or more of rotatable and articulatable with respect to the plurality of concentrically-disposed telescoping shaft sections.

* * * * *